United States Patent [19]
Kishita et al.

[11] Patent Number: 5,884,497
[45] Date of Patent: Mar. 23, 1999

[54] AUTOMOTIVE AIR CONDITIONER

[75] Inventors: Hiroshi Kishita, Anjo; Yoshiaki Takano, Obu; Satoshi Mizutani, Nagoya, all of Japan

[73] Assignee: Denso Corporation, Kariya, Japan

[21] Appl. No.: 95,342

[22] Filed: Jun. 10, 1998

[30] Foreign Application Priority Data

Jun. 17, 1997 [JP] Japan .................................. 9-159624

[51] Int. Cl.$^6$ .................................................. B60H 1/32
[52] U.S. Cl. ........................... 62/193; 62/227; 62/229; 62/228.5
[58] Field of Search ................ 62/229, 226, 227, 62/228.1, 228.3, 228.4, 228.5, 192, 193, 208, 209, 213

[56] References Cited

U.S. PATENT DOCUMENTS

| | | | |
|---|---|---|---|
| 4,480,443 | 11/1984 | Nishi et al. | 62/228.5 X |
| 4,722,196 | 2/1988 | Ishikawa | 62/193 X |
| 4,878,358 | 11/1989 | Fujii | 62/227 |
| 5,027,612 | 7/1991 | Terauchi | 62/227 X |
| 5,323,619 | 6/1994 | Kim | 62/193 K |

Primary Examiner—Harry B. Tanner

[57] ABSTRACT

An automotive air conditioner which is capable of suppressing periodic torque variation in an engine-driven refrigerant compressor while ensuring performance of returning oil thereto to circumvent periodic variation in a rotational speed of an engine, thereby preventing degradation in motor power performance and drivability of an automobile. A value of target blowout temperature is calculated using a set temperature, indoor air temperature, outdoor air temperature and intensity of solar radiation. A value of first target post-evaporation temperature (TEO1) is calculated according to a determined value of target blowout temperature. Then, a value of second target post-evaporation temperature (TEO2) corresponding to a limit level for ensuring oil return performance is calculated according to the outdoor or indoor air temperature. Thereafter, using a value of first target post-evaporation temperature (TEO1) or second target post-evaporation temperature (TEO2), whichever is smaller, as a target post-evaporation temperature (TEO), a discharge capacity of the refrigerant compressor is controlled so that an actual post-evaporation temperature (TE) will meet the target post-evaporation temperature (TEO).

13 Claims, 11 Drawing Sheets

AUTOMOTIVE AIR CONDITIONER

CROSS-REFERENCE TO RELATED APPLICATION

This application is based upon and claims the benefit of priority of the prior Japanese Patent Application No. 9-159624, filed on Jun. 17, 1997, the contents of which are incorporated herein by reference.

BACKGROUND OF THE INVENTION

1. Field of the Invention

The present invention relates to an automotive air conditioner capable of ensuring oil return performance even at a light load of cooling, and more particularly to an automotive air conditioner comprising an engine-driven refrigerant compressor which carries out capacity-variable control according to various air-conditioning environmental factors.

2. Description of Related Art

A conventional automotive air conditioner disclosed in Japanese Unexamined Patent Publication No. 147260/1989, for example, is provided with a refrigerating cycle system comprising a refrigerant compressor, which performs capacity-variable control in response to a control signal output according to result of comparison between a target post-evaporation temperature and an actual post-evaporation temperature detected by a post-evaporation temperature sensor. In this conventional system, when the actual post-evaporation temperature approaches the target post-evaporation temperature, i.e., when a cooling load is reduced to decrease a discharge capacity of the refrigerant compressor, a periodic switchover operation is performed to increase the discharge capacity of the refrigerant compressor to enhance returning oil to the refrigerant compressor.

In this conventional arrangement, in which the oil return performance under a decreased cooling load condition is ensured by increasing the discharge capacity of the refrigerant compressor periodically, significant periodic variation in torque on the refrigerant compressor occurs when the discharge capacity thereof is periodically changed from a low level to a high level. In an engine that drives the refrigerant compressor by means of a belt, a rotating speed thereof varies significantly in cycles, causing degradation in motor power performance, such as accelerating performance and climbing performance, and automobile drivability.

SUMMARY OF THE INVENTION

It is therefore an object of the present invention to provide an automotive air conditioner which is capable of suppressing periodic torque variation in a refrigerant compressor while ensuring performance of returning oil thereto.

Another object of the present invention is to provide an automotive air conditioner which is capable of preventing degradation in motor power performance and drivability of an automobile, while ensuring performance of returning oil to the refrigerant compressor.

Particularly, the present invention provides an automotive air conditioner which is capable of suppressing periodic torque variation in an engine-driven refrigerant compressor while ensuring performance of returning oil thereto. The air conditioner of the present invention thereby avoids the periodic variation in engine rotational speed, thereby preventing degradation in motor power performance and drivability of an automobile.

Initially, a target blowout temperature is calculated using a set temperature, indoor air temperature, outdoor air temperature and intensity of solar radiation. A first target post-evaporation temperature (TEO1) is calculated according to a determined value of target blowout temperature. Then, a second target post-evaporation temperature (TEO2) corresponding to a limit level for ensuring oil return performance is calculated according to the outdoor or indoor air temperature.

Thereafter, discharge capacity of the refrigerant compressor is controlled so that an actual post-evaporation temperature (TE) will meet the target post-evaporation temperature (TEO), using a value of first target post-evaporation temperature (TEO1) or second target post-evaporation temperature (TEO2), whichever is smaller, as a target post-evaporation temperature (TEO).

The above and other objects, features and advantages of the present invention will become more apparent from the following description of embodiments with reference to the accompanying drawings.

DETAILED DESCRIPTION OF THE PREFERRED EMBODIMENTS

The present invention will now be described in detail by way of example with reference to the accompanying drawings.

Figure 1:
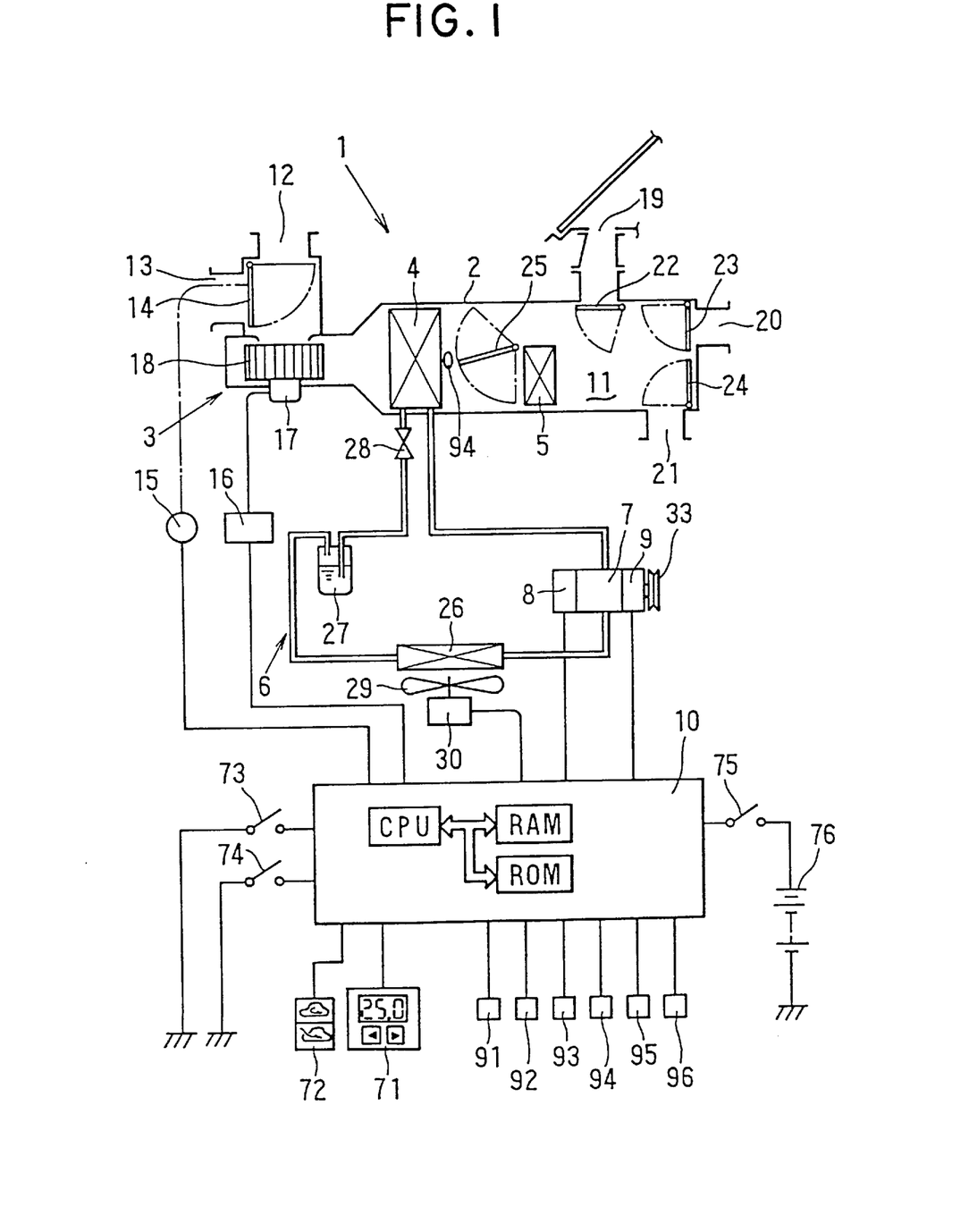
FIG. 1 is a general view showing an entire structure of an automotive air conditioner according to a first preferred embodiment of the present invention.

FIGS. 1 to 13 illustrate a first preferred embodiment of the present invention. In FIG. 1, an entire automotive air conditioner structure is shown.

The automotive air conditioner in the present preferred embodiment is structured so that each air-conditioning actuator in an air-conditioning unit 1 for conditioning indoor air in a passenger compartment of an automobile equipped with an engine E (refer to FIG. 4) is controlled by an air-conditioning control unit (ECU).

The air-conditioning unit 1 includes an air-conditioning duct 2 which forms an air passage 11 for introducing conditioned air into the passenger compartment of the automobile. At an indoor/outdoor air inlet selecting chamber part integrated on the upstream end position of the air-conditioning duct 2, an outdoor air inlet 12 is provided for introducing air outside the passenger compartment, and an indoor air inlet 13 is provided for introducing air inside the passenger compartment. On the inside of the outdoor air inlet 12 and the indoor air inlet 13, an indoor/outdoor air selector door 14 of a pivotable type is provided for air intake selection between an outdoor air introducing mode and an indoor air circulating mode. The indoor/outdoor air selector door 14 is driven by a servo motor 15.

On the downstream side of the indoor/outdoor air inlet selecting chamber part, a centrifugal blower 3 is provided for producing an air flow to the passenger compartment through the air-conditioning duct 2. The centrifugal blower 3' comprises a scroll casing integrated on the air-conditioning duct 2, a blower motor 17 having a duty ratio regulated by a blower drive circuit 16, and a centrifugal fan 18 driven by the blower motor 17. In the present preferred embodiment, an air flow rate of the centrifugal fan 18 is adjustable in a range of level 0 (OFF) to level 32 in a continuous or stepwise manner.

At an air outlet selecting chamber part integrated on the downstream end position of the air-conditioning duct 2, there are provided a defrosting air outlet 19 for mainly delivering warm air toward the internal surface of a windshield of the automobile, a face air outlet 20 for mainly delivering cold air toward the upper part of each occupant in the passenger compartment, and a foot air outlet for mainly delivering warm air toward the feet of each occupant in the passenger compartment. On the inside of each of the air outlets 19–21, a pivotable defrosting air door 22, a pivotable face air door 23 and a pivotable foot air door 24 are equipped respectively. These pivotable doors 22–24 are driven by a servo motor (not shown). By opening/closing these doors, it is possible to select a face mode, bi-level (B/L) mode, foot mode, foot-defroster (F/D) mode, or defroster (DEF) mode.

On the upstream side of the air outlet selecting chamber part, a heater unit is provided. The heater unit is equipped with a heater core 5 for reheating cold air fed through an evaporator 4, which will be described later. Supplied with heated cooling water from the engine E, the heater core 5 serves as a heating-cycle heat exchanger for reheating cold air using the heated cooling water as a heat source for heating operation. On the upstream side of the heater core 5, an air mixing door 25 of a pivotable type is provided. The air mixing door 25 is driven by a servo motor (not shown), and it serves as temperature regulator means for regulating a degree of air heating. More specifically, according to its stop position, a rate of air flow passing through the heater core 5 and a rate of air flow bypassing the heater core 5 are regulated.

Between the centrifugal blower 3 and the heater unit, there is provided a cooling unit. In the cooling unit, the evaporator 4, which is a component part of a refrigerating cycle system 6 mounted on the vehicle is arranged to occupy an entire cross-sectional area of the air passage 11 in the air-conditioning duct 2. In the refrigerating cycle system 6, the following components are connected by means of refrigerant piping: a compressor 7 for sucking, compressing and discharging refrigerant; a condenser 26 for condensing and liquefying refrigerant fed from the compressor 7 by means of heat exchange with outdoor air; a receiver 27 for performing vapor-liquid separation of refrigerant fed from the condenser 26 and temporarily storing residual refrigerant in the refrigerating cycle system 6; an expansion valve 28 for performing pressure-reducing expansion of liquid refrigerant fed from the receiver 27; and said evaporator 4 for evaporating low-pressure refrigerant fed from the expansion valve 28 by means of heat exchange with air in the air-conditioning duct. Reference numeral 29 indicates a cooling fan which is run by the drive motor 30 for forcedly blowing outdoor air to the condenser 26.

Figure 2:
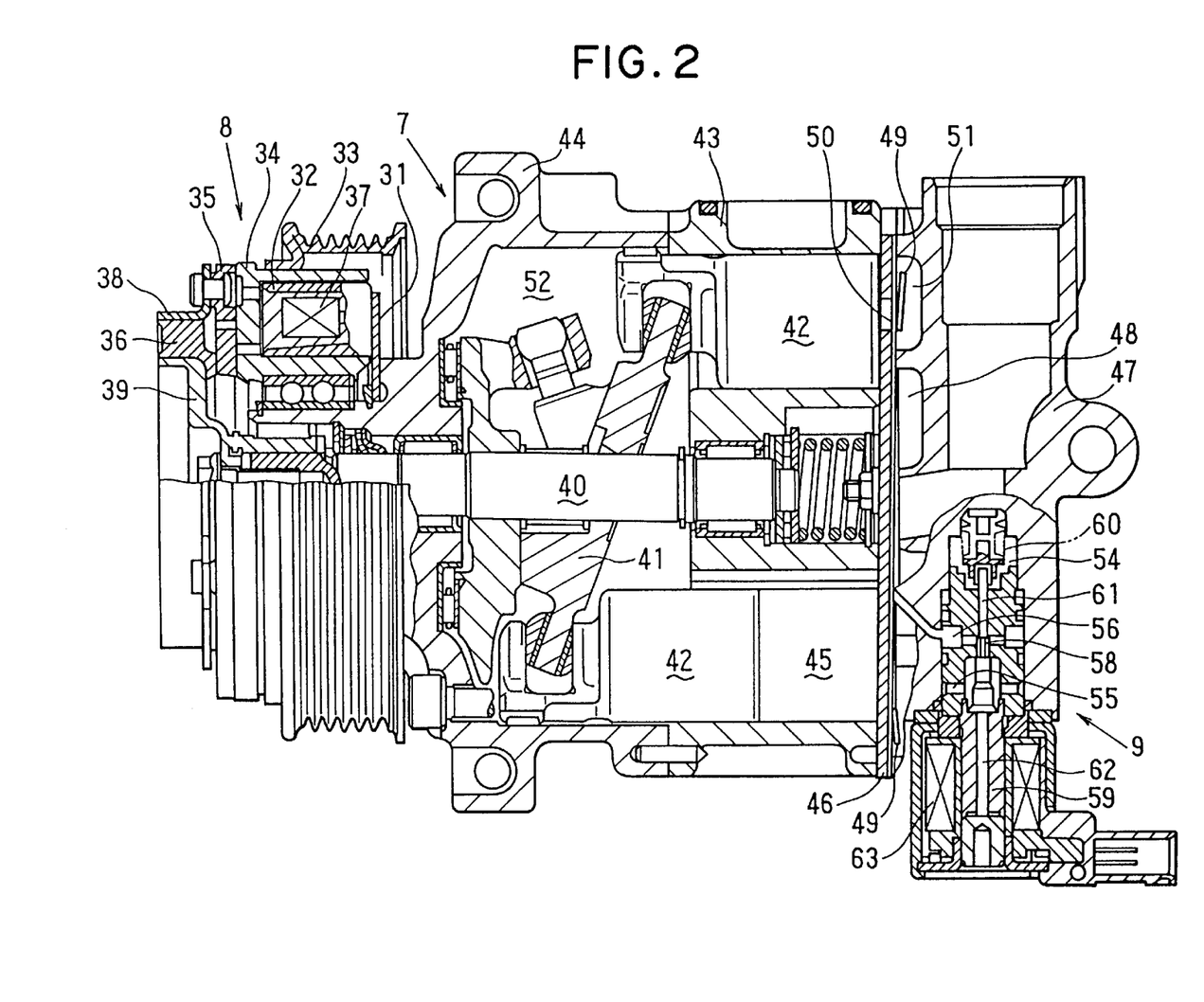
FIG. 2 is a sectional view showing an electromagnetic clutch and a discharge-capacity-variable compressor of the first preferred embodiment.

The following briefly describes the compressor 7 in the present preferred embodiment with particular reference to FIGS. 1–5. FIG. 2 shows a structure of the compressor 7 of a discharge-capacity-variable type, which is integrated with an electromagnetic clutch 8. The compressor 7 is arranged integrally with the electromagnetic clutch 8 for transmitting/disconnecting power of the engine E to/from the compressor 7.

The electromagnetic clutch 8 includes: a stator housing 32 secured on a housing 44 of the compressor 7 via a toroidal mounting flange 31; a rotor 34 having a circumferential part joined to a pulley 33 which is connected with the engine E via a V-belt; an armature 35 which is arranged at a position opposite to the rotor 34 with a narrow gap and has a friction face for frictional engagement with a friction face of the rotor 34; an electromagnetic coil 37 for attracting the armature 35 to the rotor 34 in opposition to elasticity of a rubber hub 36 (elastic material) by producing magnetic flux at energization; and an inner hub 39 for coupling the armature 35 with a shaft 40 of the compressor 7 via an outer hub 38 and the rubber hub 36.

The compressor 7 is capable of regulating its own discharge capacity, e.g., it is of a well-known waffle type. The compressor 7 includes the shaft 40 rotating together with the inner hub 39 of the electromagnetic clutch 8, a swash plate 41 obliquely secured to the shaft 40, a piston 42 located on the swash plate 41, the housing 44 combined with a cylinder 43 in which the piston 42 reciprocates, and an electromagnetic capacity control valve 9 for regulating a discharge capacity of the compressor 7.

Figure 3A:
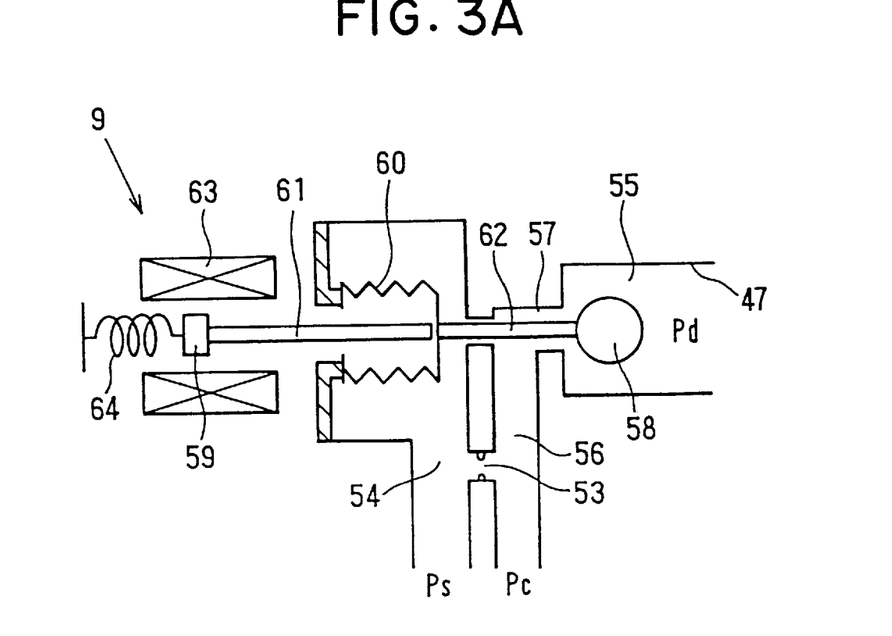
FIG. 3A is a schematic diagram showing an electromagnetic capacity control valve 9 incorporated in a compressor 7 of the first preferred embodiment.

The cylinder 43 forms a cylinder chamber 45 with the piston 42. At the center part of a valve plate 46 on the cylinder chamber 45, a suction inlet (not shown) is provided which is opened/closed by a suction valve (not shown) made of elastic metal. The suction inlet communicates with a suction port 48 formed on a valve body 47 of the electromagnetic capacity control valve 9. At the outer part of the valve plate 46, a discharge outlet 50 is provided which is opened/closed by a discharge valve 49 made of elastic metal. The discharge outlet 50 communicates with a discharge port 51 formed on the valve body 47. In the inside of the housing 44, there is provided a fixed restrictor 53 (shown in FIG. 3) which is used for effective communication between the suction port 48 and a crank chamber 52 for free displacement of the swash plate 41.

In the abovementioned arrangement, when the electromagnetic coil 37 of the electromagnetic clutch 8 is energized (ON), the armature 35 of the electromagnetic clutch 8 is attracted to the rotor 34 to make frictional engagement between the rotor 34 and the armature 35. Power is thereby transmitted from the engine E to the shaft 40 of the compressor 7 via the V-belt and electromagnetic clutch 8. The refrigerating cycle system 6 is thus started and air cooling is performed by the evaporator 4. When the electromagnetic coil 37 of the electromagnetic clutch 8 is de-energized (OFF), the armature 35 of the electromagnetic clutch 8 is no longer attracted to the rotor 34, and thereby releases frictional engagement between the rotor 34 and the armature 35. Thus, power of the engine E is not transmitted to the shaft 40 of the compressor 7, thereby causing the evaporator 4 to stop cooling air.

Figure 3B:
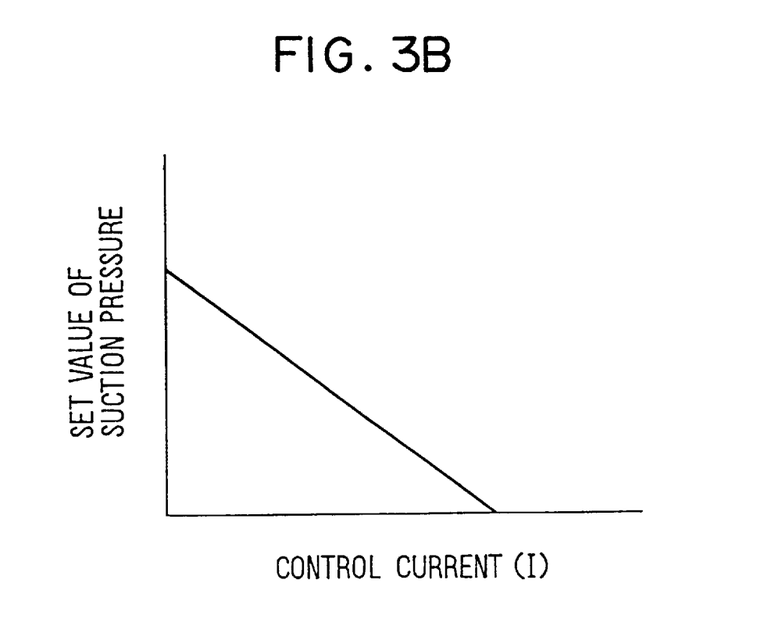
FIG. 3B is a graph showing the relationship between a control current and a suction pressure set level of the first preferred embodiment.

The following describes the electromagnetic capacity control valve 9 with particular reference to FIGS. 1 to 3. FIG. 3A shows a schematic arrangement of the electromagnetic capacity control valve 9 incorporated in the compressor 7, and FIG. 3B shows a relationship between a control current and a suction pressure set level.

The electromagnetic capacity control valve 9 comprises a pressure passage 54 to which a suction pressure (Ps) of the compressor 7 is applied, a pressure passage 55 to which a discharge pressure (Pd) of the compressor 7 is applied, a pressure passage 56 for applying a crank chamber pressure (Pc) to the crank chamber 52 of the compressor 7, and the valve body 47 having a communicating port 57 for connection between the pressure passages 55 and 56.

A degree of opening of the communicating port 57 is determined by a stop position of a valve 58, and the valve 58 is stopped according to displacement positions of a plunger 59 and bellows part 60. The plunger 59 and bellows part 60 are connected with the valve 58 via rods 61 and 62. In this structure, the plunger 59 is designed so that a setting position thereof can be changed according to a level of control current applied to an electromagnetic coil 63. Reference numeral 64 indicates a return spring for returning the plunger 59 to an initial position thereof.

Therefore, the electromagnetic capacity control valve 9 serves as a discharge capacity varying means for regulating a discharge capacity of the compressor 7 by changing a set level of suction pressure (Ps) of the compressor 7 according to a control current supplied from the air conditioner ECU 10 as shown in FIG. 3B. More specifically, as shown in FIG. 3A, the electromagnetic capacity control valve 9 is structured so that an external force to the plunger 59 and bellows part 60 is changed by applying the control current to the electromagnetic coil 63 in the valve body 47. The degree of opening of the valve 58 in relation to the suction pressure (Ps) is controlled to provide a target post-evaporation temperature (TEO).

Figure 4:
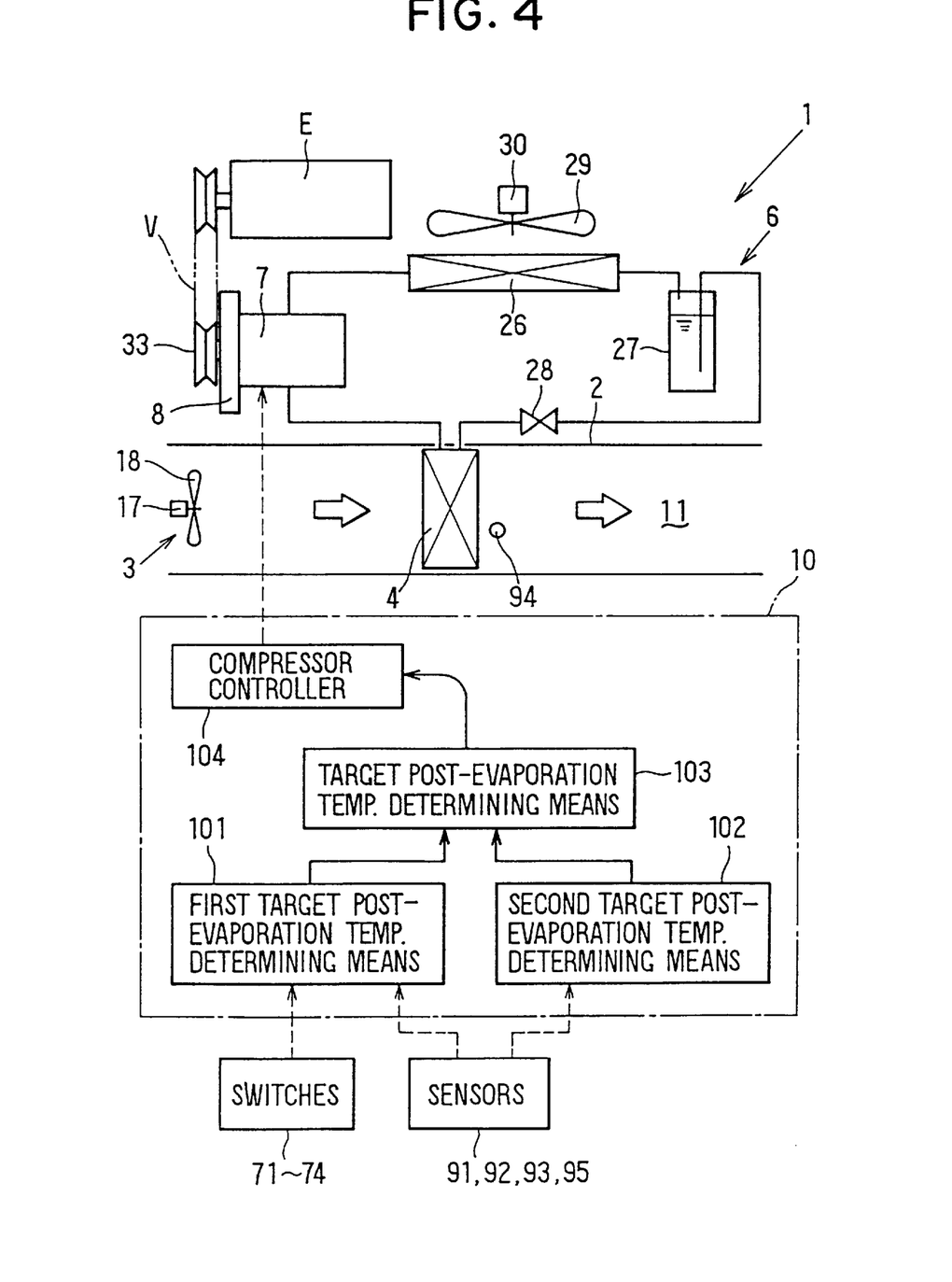
FIG. 4 is a block diagram showing a control system of the automotive air conditioner of the first preferred embodiment.

The following describes a control system of the automotive air conditioner in the present preferred embodiment with particular reference to FIGS. 1 and 4. FIG. 4 schematically shows the control system of the automotive air conditioner. The air conditioner ECU 10 for controlling each air-conditioning means in the air-conditioning unit 1 is supplied with each switch signal input from each switch equipped on an air conditioner control panel (not shown) mounted on the front position in the passenger compartment.

The air conditioner control panel is equipped with the following components: a temperature setting switch 71 for setting an indoor air temperature to a desired temperature level; an indoor/outdoor air selector switch 72 for selecting the outdoor air introducing mode or the indoor air circulating mode for air intake; an air conditioner ON/OFF switch 73 for starting/stopping the refrigerating cycle system 6; an auto switch 74 for instructing automatic air-conditioning control; a mode selector switch (not shown) for blowout air mode selection, and an air flow rate selector switch (not shown) for selecting an air flow rate level of the centrifugal fan 18 (OFF, Lo, Me 1, Me 2, Hi).

In the inside of the air conditioner ECU 10, there is provided a well-known microcomputer comprising a CPU, ROM, RAM, and other conventional computer components. Each sensor signal from each sensor is converted into a digital signal by an input circuit (not shown). Each digital signal is then input to the microcomputer. The air conditioner ECU 10 is arranged so that DC power is supplied thereto from a battery 76 mounted on the automobile (on-vehicle power supply) when an ignition switch 75 (key switch) used for starting/stopping operation of the engine E on the automobile is turned on.

The microcomputer comprises first target post-evaporation temperature determining means 101 for determining a first target post-evaporation temperature (TEO1) according to a target blowout temperature (TAO) for example, and second target post-evaporation temperature determining means 102 for determining a second target post-evaporation temperature (TEO2) which is used as a limit level of post-evaporation temperature for ensuring oil return performance of the compressor 7. Also, the microcomputer includes target post-evaporation temperature determining means 103 for outputting a signal of target post-evaporation temperature (TEO) indicating a value of first target post-evaporation temperature (TEO1) or a value of second target post-evaporation temperature (TEO2), whichever is smaller, and compressor control means 104 for controlling a capacity of the compressor 7 so that an actual post-evaporation temperature (TE) will meet the target post-evaporation temperature (TEO).

The above switches and sensors are used for detecting air-conditioning environmental factors necessary for conditioning air in the passenger compartment. The air conditioner ECU 10 is connected with an indoor air temperature sensor 91 serving as indoor air temperature detecting means for detecting a temperature of air inside the passenger compartment, an outdoor air temperature sensor 92 serving as outdoor air temperature detecting means for detecting a temperature of air outside the passenger compartment, and a solar radiation sensor 93 serving as solar radiation intensity detector for detecting an intensity level of solar radiation incident on the inside of the passenger compartment. Moreover, the air conditioner ECU 10 is connected with a post-evaporation temperature sensor 94 serving as cooling degree detector for detecting a degree of actual air cooling by the evaporator 4, a humidity sensor 95 serving as humidity detector for detecting a relative humidity of air inside the passenger compartment, and a rotational speed sensor 96 serving as rotational speed detector for detecting a rotational speed of the engine E of the automobile. As shown in FIGS. 1 and 4, the post-evaporation temperature sensor 94 is equipped at a downstream position of direct air coming out of the evaporator 4 on the air passage 11. The sensor 94 is used as a thermistor for detecting a temperature of cold air at the downstream position. In particular, the post-evaporation temperature sensor 94 is used for detecting air flow temperature immediately after passing through the evaporator 4.

In a manual control operation, the air conditioner ECU 10 determines whether the outdoor air introducing mode or the indoor air circulating mode is selected for air intake, according to a setting position of the indoor/outdoor air selector switch 72. In an automatic control operation, the air conditioner ECU 10 determines whether the outdoor air introducing mode or the indoor air circulating mode is selected according to a control signal applied to the servo motor 15. Still more, in both the manual and automatic control operations, the air conditioner ECU 10 detects an air flow rate level of the centrifugal fan 18 according to a control signal applied to the blower drive circuit 16. Also, in the present invention, there may be provided such an arrangement that a blowing level of the centrifugal fan 18 is detected according to a setting position of the air flow rate selector switch.

Figure 5:
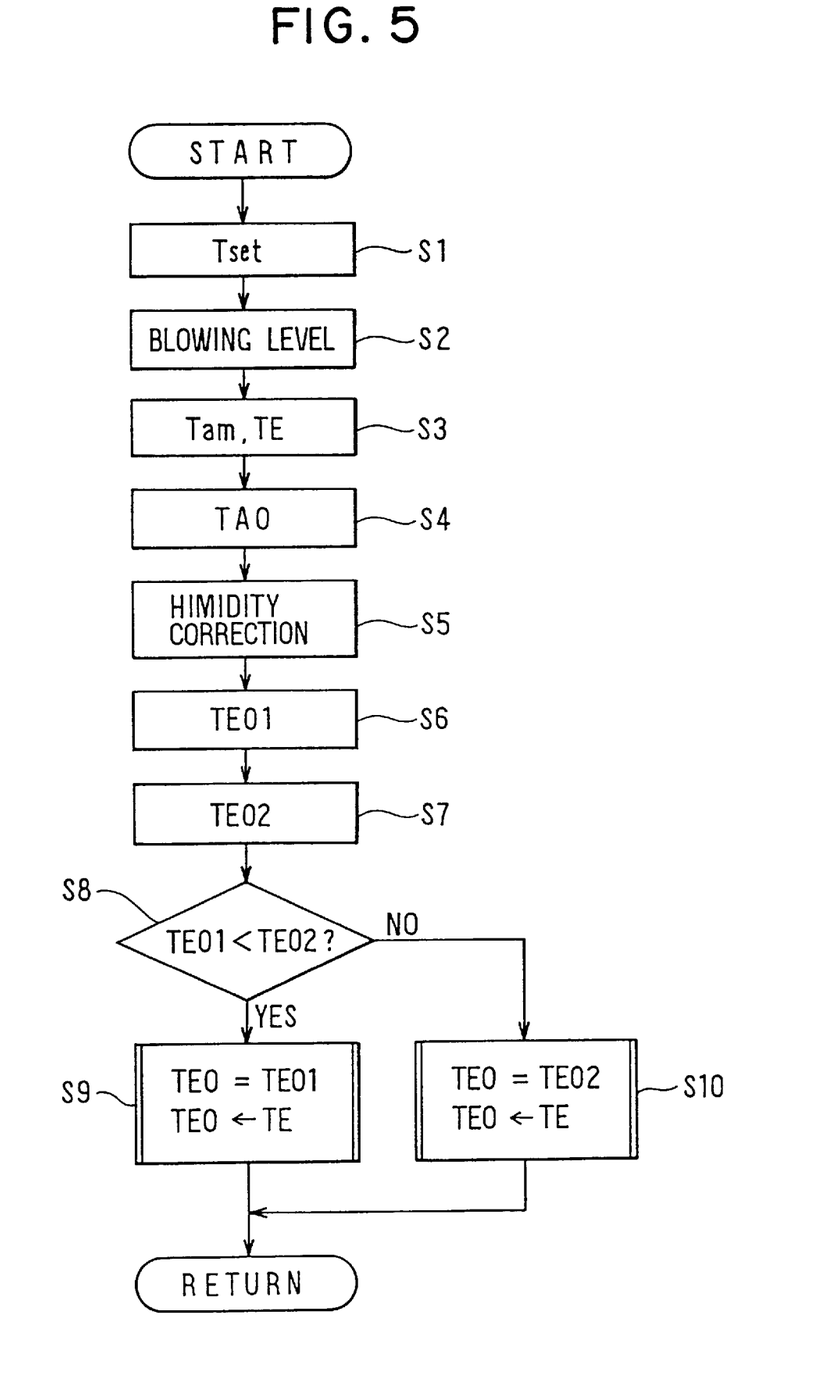
FIG. 5 is a diagram showing steps of compressor capacity-variable control carried out by an air conditioner ECU of the first preferred embodiment.
Figure 6:
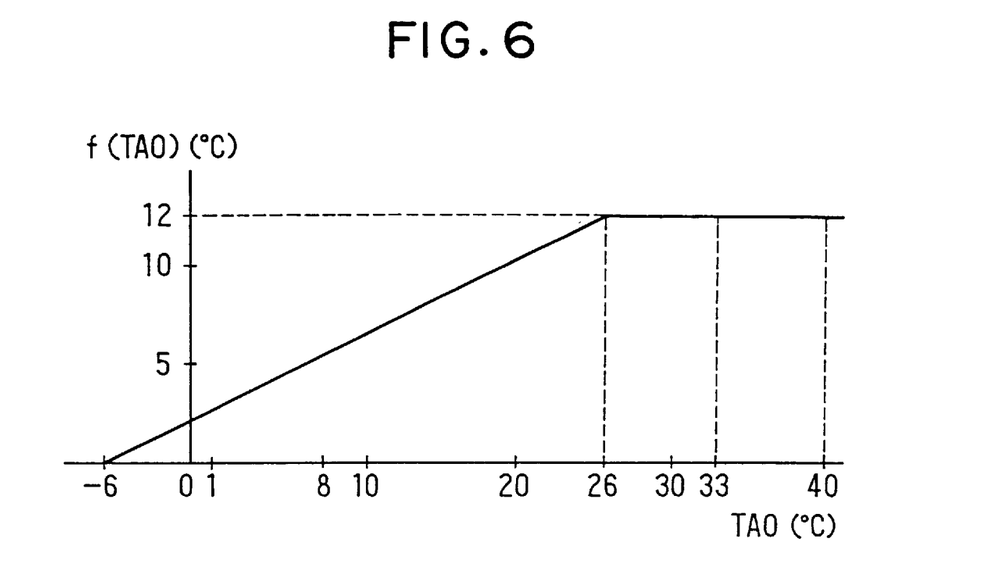
FIG. 6 is a characteristic graph showing the correlation between a target blowout temperature and a first target post-evaporation temperature of the first preferred embodiment.
Figure 7:
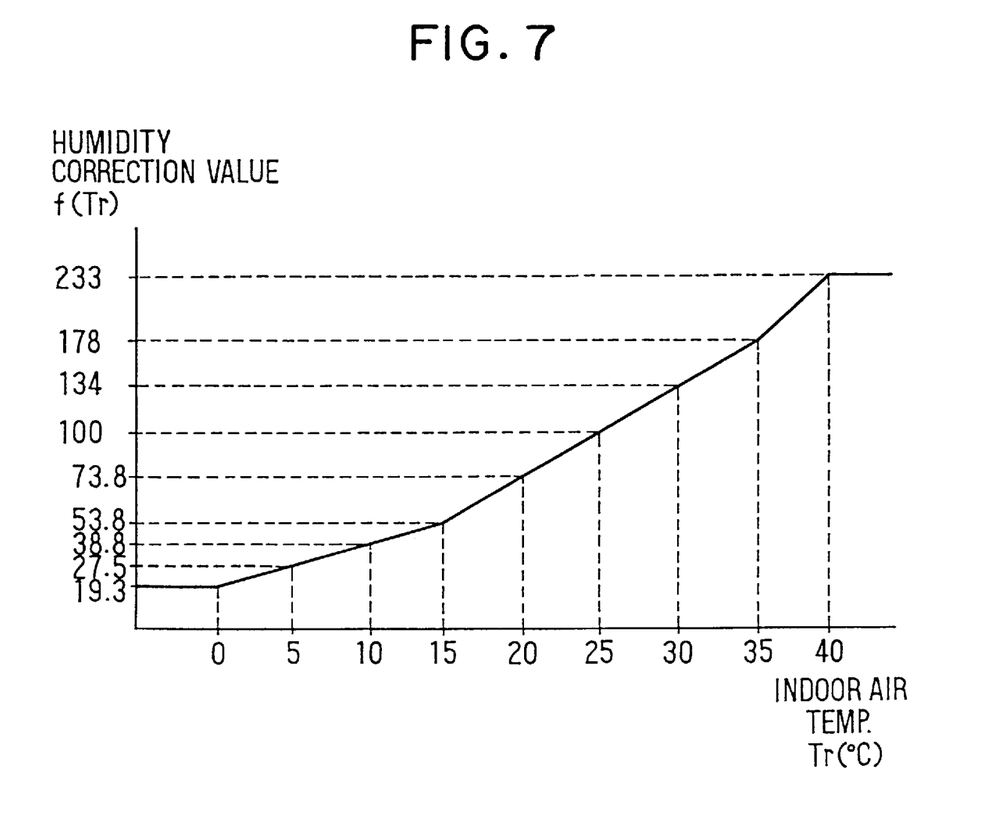
FIG. 7 is a characteristic graph showing the correlation between an indoor air temperature and a humidity correction value of the first preferred embodiment.

Operation in first preferred embodiment:

With particular reference to FIGS. 1–13, the following describes the operation of the air conditioner ECU 10 in the first preferred embodiment of the present invention. FIG. 5 shows a flowchart of compressor capacity-variable control steps carried out by the air compressor ECU 10.

When the ignition switch 75 is turned on, DC current is supplied to the air conditioner ECU 10 to start the routine shown in FIG. 5. At step S1, each switch signal is then read in from each switch equipped on the air conditioner control. For example, a set temperature (Tset) specified with the temperature setting switch 71 is read in. At step S2, a control signal output to each actuator is read in. To be more specific, a control signal applied to the servo motor 15 is read in for detection of the outdoor air introducing mode or the indoor air circulating mode. Then, an air flow rate level of the centrifugal fan 18 is detected by reading in a control signal applied to the blower drive circuit 16.

Thereafter, at step S3, each sensor signal is read in from each sensor. More specifically, the following conditions are read in: an indoor air temperature (Tr) detected by the indoor air temperature sensor 91; an outdoor air temperature (Tam) detected by the outdoor air temperature sensor 92; solar radiation intensity (Ts) detected by the solar radiation sensor 93; an actual post-evaporation temperature (TE) detected by the post-evaporation temperature 94; air relative humidity inside the passenger compartment (RH) detected by the humidity sensor 95; and engine rotational speed (NE) detected by the rotational speed sensor 96.

A magnitude of cooling load on the refrigerating cycle system 6 is determined. More specifically, at step S4, a value of target blowout temperature (TAO) of air to be delivered into the passenger compartment is calculated according to Equation 1 (shown below), which is programmed into the ROM. That is, according to a pattern shown in FIG. 6 and programmed into the ROM, calculation (setting) is performed so that a value of first post-evaporation temperature (TEO1) becomes higher as a value of target blowout temperature (TAO) increases.

$$TAO = Kset \times Tset - Kr \times Tr - Kam \times Tam - Ks \times Ts + C \qquad \text{(Equation 1)}$$

where Tset indicates a set temperature specified by the temperature setting switch 71, Tr indicates an indoor air temperature detected by the indoor air temperature sensor 91, Tam indicates an outdoor air temperature detected by the outdoor air temperature sensor 92, and Ts indicates an intensity of solar radiation detected by the solar radiation sensor 93. Kset, Kr, Kam and Ks are gain values, and C is a constant for correction.

For the target blowout temperature (TAO) specified at step S4, humidity correction is performed at step S5 according to a value of relative humidity inside the passenger compartment (RH) detected by the humidity sensor 95, and a value of indoor air temperature (Tr) detected by the indoor air temperature sensor 91. To be more specific, according to the pattern shown in FIG. 7, which is programmed into the ROM, a relative humidity corresponding to a temperature level of 25° C. (RH25) is calculated using Equation (2) indicated below. Based on a calculated value of RH25, a value of humidity correction f2 (RH25) is calculated using Equation (3).

$$RH25 = f(Tr) \times RH/60 \qquad \text{(Equation 2)}$$

$$f2(RH25) = (RH25 - 60) \times 0.15 \qquad \text{(Equation 3)}$$

where RH indicates a relative humidity inside the passenger compartment detected by the humidity sensor 95, and Tr indicates an indoor air temperature detected by the indoor air temperature sensor 91.

Note that RH is 30 under condition $RH25 \leq 30$ or RH is 90 under condition $RH25 \geq 90$.

At step S6, according to the target blowout temperature (TAO) determined at step S4 and the humidity correction value f2 (RH25) calculated at step S5, a first target post-evaporation temperature value of conditioned air coming out of the evaporator 4 (TEO1: first target cooling degree, first target air temperature) is calculated using Equation (4).

$$TEO1 = f(TAO) - f2(RH25) \qquad \text{(Equation 4)}$$

At step S7, in accordance with the switch signal read in at step S1, the control signal read in at step S2 and the sensor signal read in at step S3, a value of second target post-evaporation temperature, which corresponds to a limit level of post-evaporation temperature for ensuring oil return performance of the compressor 7, (TEO2: second target cooling degree, second target air temperature) is calculated.

Figure 8:
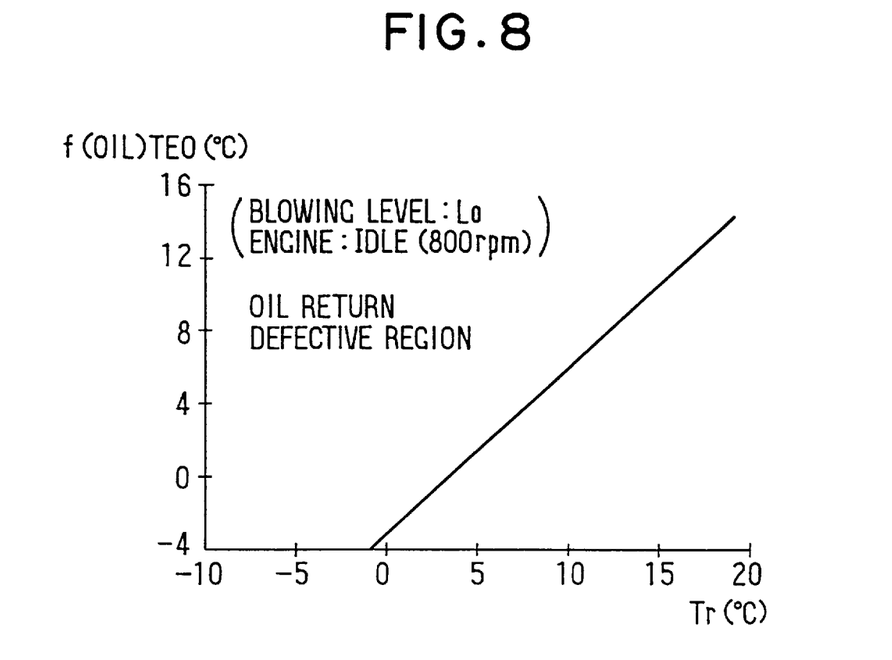
FIG. 8 is a characteristic graph showing the correlation between the indoor air temperature and a second target post-evaporation temperature of the first preferred embodiment.
Figure 9:
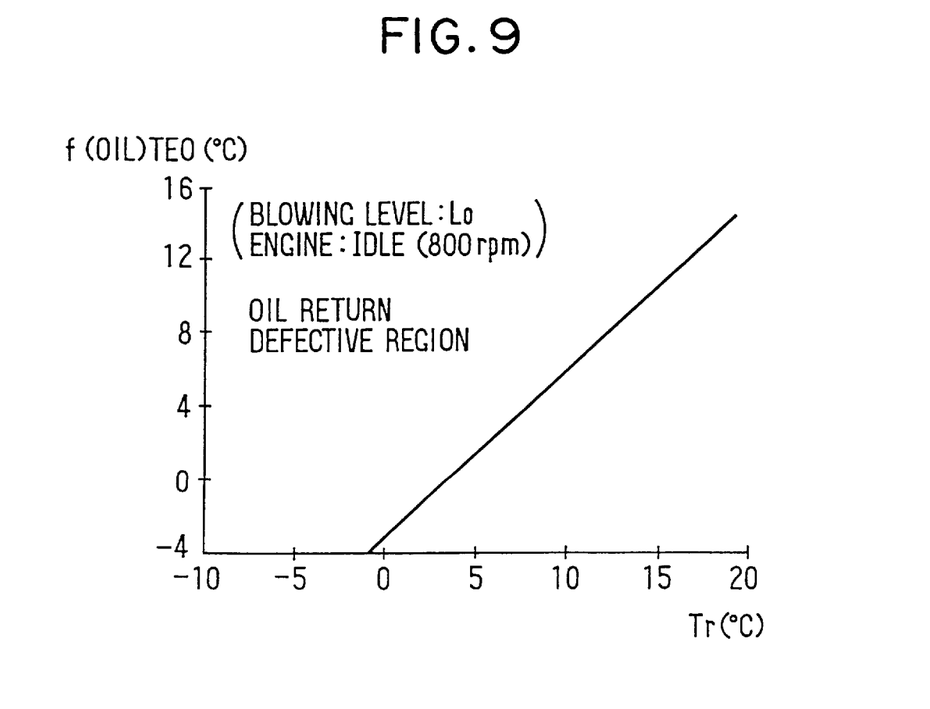
FIG. 9 is a characteristic graph showing the correlation between an outdoor air temperature and the second target post-evaporation temperature of the first preferred embodiment.

More specifically, in the indoor air circulating mode for air intake, a value of second target post-evaporation temperature (f(oil) TEO) is calculated using a value of indoor air temperature (Tr) detected by the indoor air temperature sensor 91 according to the pattern shown in FIG. 8 which is programmed into the ROM. In the outdoor air introducing mode, a value of second target post-evaporation temperature (f(oil) TEO) is calculated using a value of outdoor air temperature (Tam) detected by the outdoor air temperature sensor 92 according to the pattern shown in FIG. 9 which is also programmed into the ROM.

Figure 10:
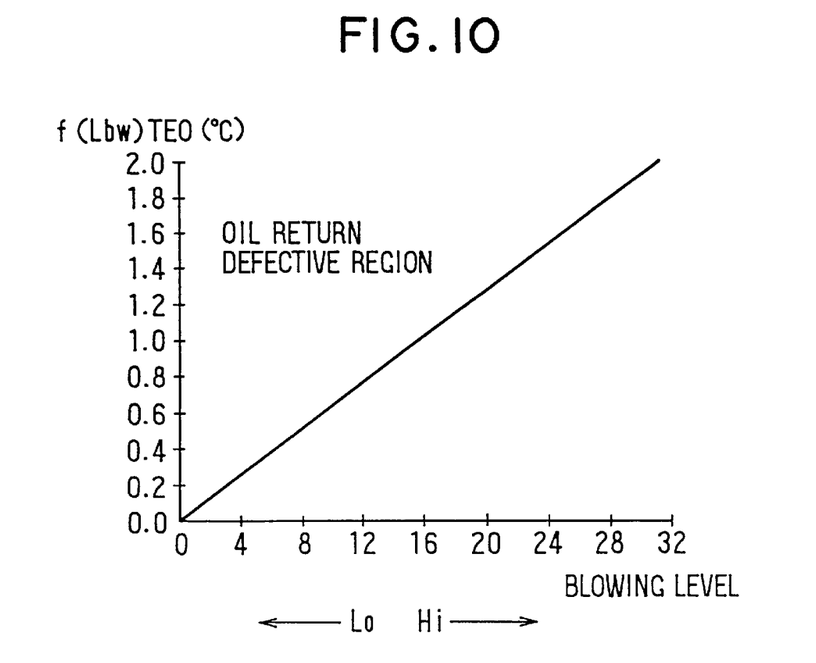
FIG. 10 is a characteristic graph showing a correlation between a blowing level of a centrifugal fan and an air flow rate correction value of the first preferred embodiment.
Figure 11:
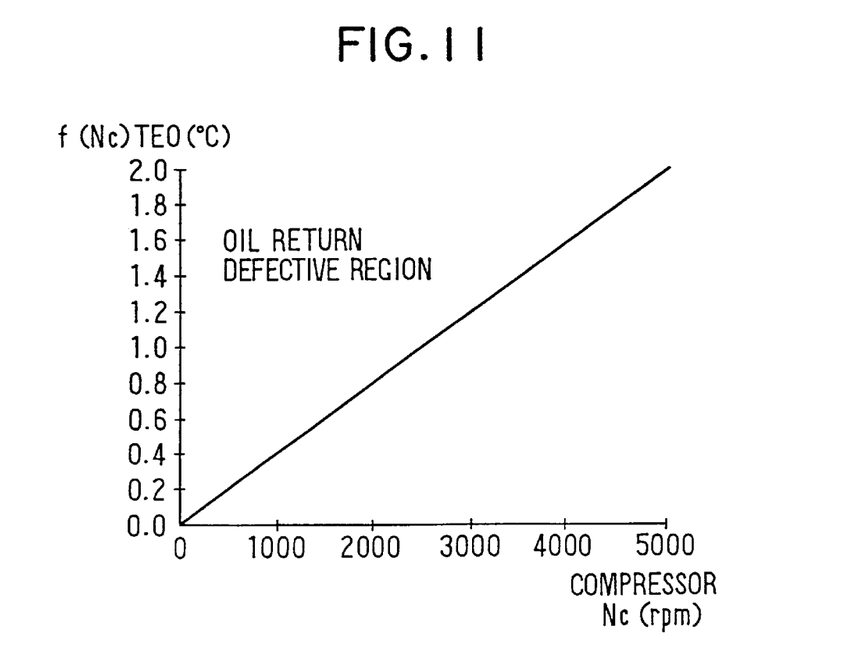
FIG. 11 is a characteristic graph showing the correlation between a rotating speed of the compressor and a rotating speed correction value of the first preferred embodiment.

Then, a value of air flow rate correction f(Lbw) TEO is calculated using a blowing level of the centrifugal fan 18 according to the pattern shown in FIG. 10, which is programmed into the ROM. A value of rotational speed correction f(Nc) TEO is calculated using a rotational speed Nc of the compressor 7 (the product obtained by multiplying a pulley ratio and a rotational speed of the engine E detected by the rotational speed sensor 96), and a value of second target post-evaporation temperature (TEO2) is calculated using Equation (5) indicated below.

$$TEO2 = f(\text{oil})TEO + f(Lbw)TEO + f(Nc)TEO \quad \text{(Equation 5)}$$

At step S8, it is determined whether or not the value of first target post-evaporation temperature (TEO1) determined at step S6 is lower than the value of second target post-evaporation temperature (TEO2) determined at step S7. If the result of this check is 'YES', i.e., the value of first target post-evaporation temperature (TEO1) is lower than the value of second target post-evaporation temperature (TEO2), capacity control of the compressor 7 is carried out at step S9 so that an actual post-evaporation temperature (TE) detected by the post-evaporation temperature sensor 94 will meet the value of first target post-evaporation temperature (TEO1). More particularly, a control current (I) applied to the electromagnetic coil 63 of the electromagnetic capacity control valve 9 is regulated. Thereafter, the processing sequence is returned to the first step thereof.

On the contrary, if the result of the check at step S8 is 'NO', i.e., the value of second target post-evaporation temperature (TEO2) is lower than the value of first target post-evaporation temperature (TEO1), capacity control of the compressor 7 is carried out at step S10 so that the actual post-evaporation temperature (TE) detected by the post-evaporation temperature sensor 94 will meet the value of second target post-evaporation temperature (TEO2). More particularly, the control current (I) applied to the electromagnetic coil 63 of the electromagnetic capacity control valve 9 is regulated. Thereafter, the processing sequence is returned to the first step thereof.

Figure 12A:
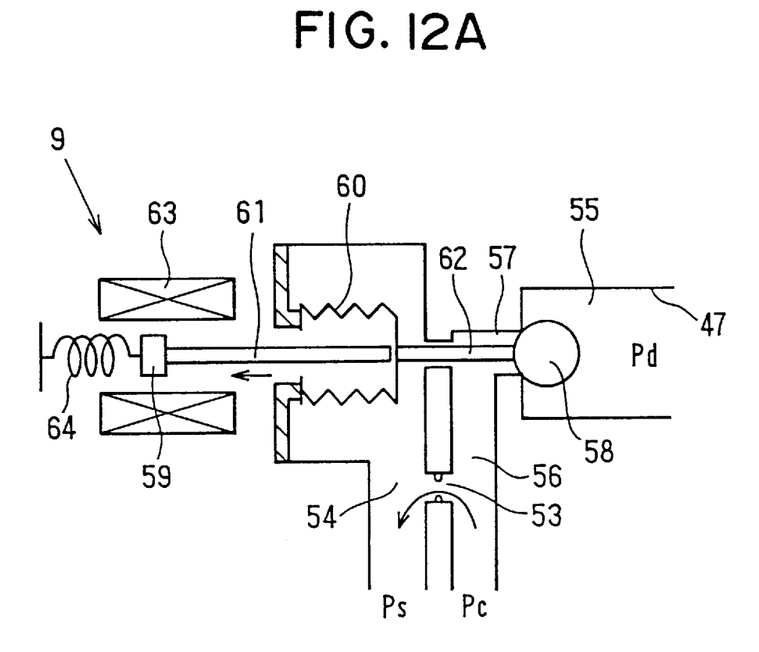
FIG. 12A is a schematic diagram showing a state of the electromagnetic capacity control valve under condition that a discharge capacity is increased in the first preferred embodiment.
Figure 12B:
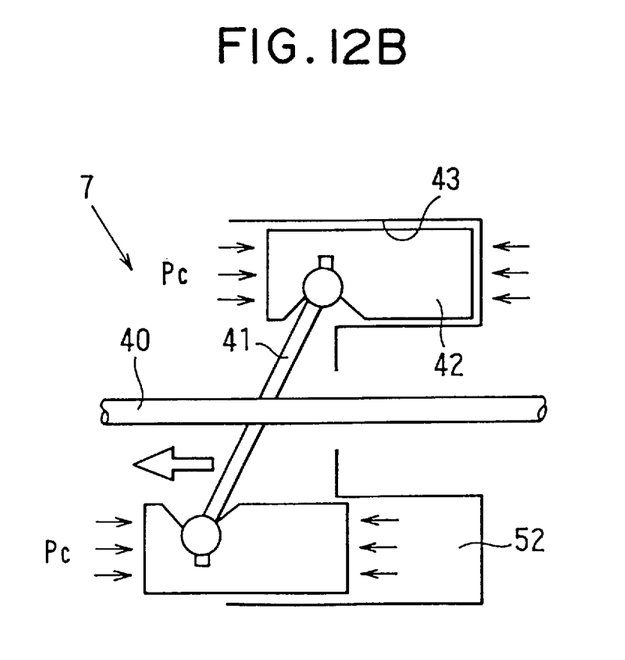
FIG. 12B is a schematic diagram showing a state of the compressor under condition that the discharge capacity is increased in the first preferred embodiment.
Figure 13A:
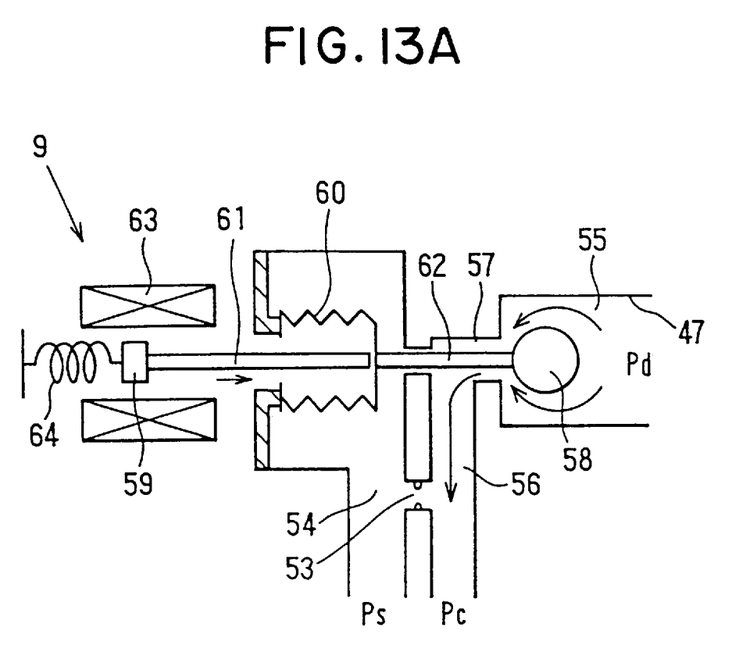
FIG. 13A is a schematic diagram showing a state of the electromagnetic capacity control valve under condition that the discharge capacity is decreased in the first preferred embodiment.
Figure 13B:
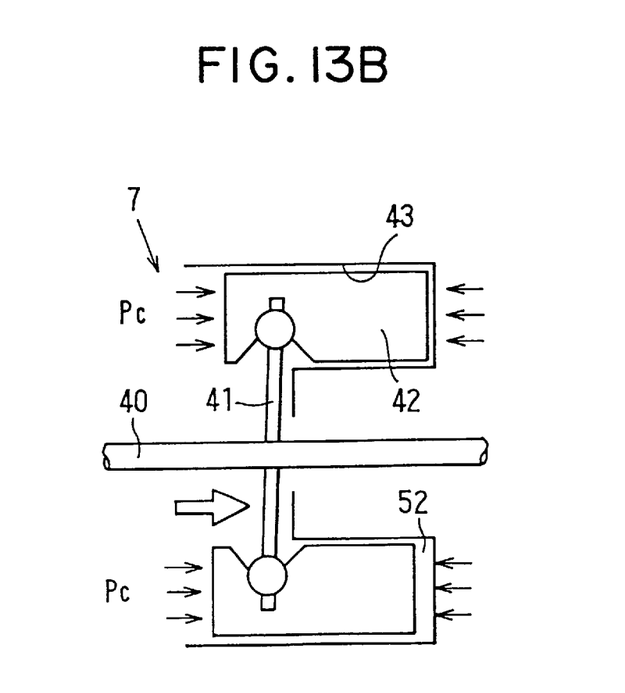
FIG. 13B is a schematic diagram showing a state of the compressor under condition that the discharge capacity is decreased in the first preferred embodiment.

With particular reference to FIGS. 12 and 13, the following describes a method of varying a discharge capacity of the compressor 7 with the electromagnetic capacity control valve 9. FIG. 12A shows a state of the electromagnetic capacity control valve under condition that the discharge capacity is increased, and FIG. 12B shows a state of the compressor under condition that the discharge capacity is increased. FIG. 13A shows a state of the electromagnetic capacity control valve under condition that the discharge capacity is decreased, and FIG. 13B shows a state of the compressor under condition that the discharge capacity is decreased.

In a situation where the actual post-evaporation temperature (TE) is far higher than the target post-evaporation temperature (TEO), the control current (I) applied to the electromagnetic coil 63 of the electromagnetic capacity control valve 9 is decreased to increase a set value of suction pressure (Ps) of the compressor 7 for ensuring performance of returning oil to the compressor 7. In this case, as shown in FIG. 12A, the bellows part 60 of the electromagnetic capacity control valve 9 is retracted to displace the valve 58 of the electromagnetic capacity control valve 9 slightly, decreasing the degree of opening of the communicating port 57. Thus, it becomes relatively difficult for the discharge pressure (Pd) of the compressor 7 to enter the pressure passage 56, thereby reducing the crank chamber pressure (Pc). As shown in FIG. 12B, reduction in the crank chamber pressure (Pc) increases an angle of inclination of the swash plate 41 of the compressor 7 to prolong a stroke of the piston 42. Therefore, the discharge pressure (Pd) of the compressor 7 is increased to increase the discharge capacity of the compressor 7.

In a situation where the actual post-evaporation temperature (TE) is approximately equal to the target post-evaporation temperature (TEO), i.e., performance of returning oil to the compressor 7 is ensured, the control current (I) applied to the electromagnetic coil 63 of the electromagnetic capacity control valve 9 is increased to decrease the set value of suction pressure (Ps) of the compressor 7. In this case, as shown in FIG. 13A, the bellows part 60 is extended to displace the valve 58 significantly to increase the degree of opening of the communicating port 57. Thus, the discharge pressure (Pd) of the compressor 7 is exerted onto the pressure passage 56 to increase the crank chamber pressure (Pc). As shown in FIG. 13B, when the crank chamber pressure (Pc) is increased, the angle of inclination of the swash plate 41 of the compressor 7 is decreased to shorten the stroke of the piston 42. Therefore, the discharge pressure (Pd) of the compressor 7 is decreased to decrease the discharge capacity of the compressor 7.

Advantageous Effects In First Preferred Embodiment:

As mentioned above, in the automotive air conditioner in the first preferred embodiment, the control current (I) applied to the electromagnetic coil 63 of the electromagnetic capacity control valve 9 is regulated so that the actual post-evaporation temperature (TE) will meet the value of target post-evaporation temperature (TEO1) determined according to the target blowout temperature (TAO), or the value of second post-evaporation temperature (TEO2), for ensuring performance of returning oil to the compressor 7, whichever is smaller. Thus, the discharge pressure (Pd) of the compressor 7 is changed to control the discharge capacity of the compressor 7.

Therefore, since the discharge capacity of the compressor 7 is not increased periodically, significant periodic variation in torque does not occur on the compressor 7, i.e., the rotational speed of the engine E which runs the compressor 7 does not vary significantly. Thus, degradation in motor power performance, such as accelerating performance and climbing performance, and drivability of the automobile, can be prevented.

Figure 14:
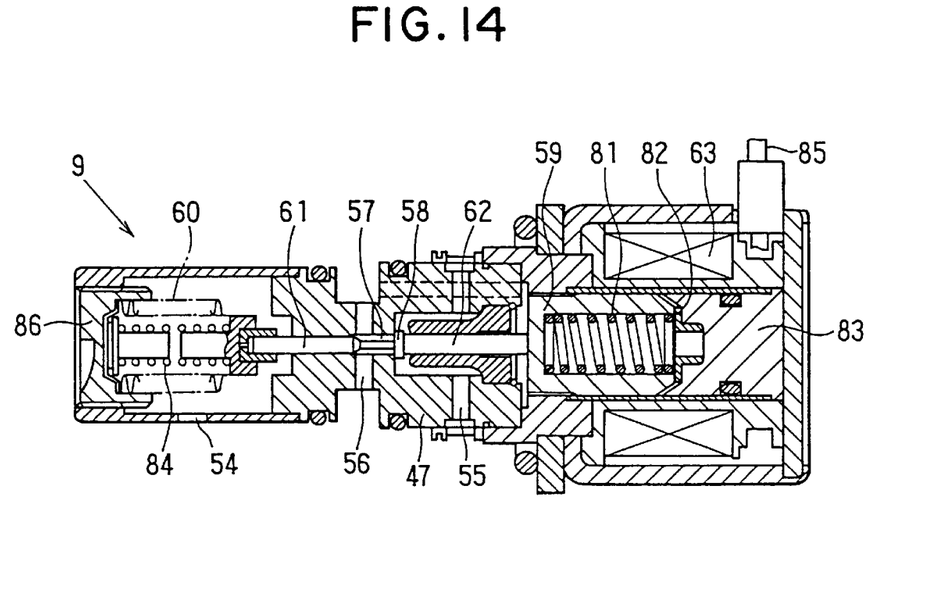
FIG. 14 is a sectional view showing the electromagnetic capacity control valve incorporated in the compressor of a second preferred embodiment.

Second preferred embodiment:

Referring to FIG. 14, there is shown a structure of an electromagnetic capacity control valve incorporated in a compressor in a second preferred embodiment of the present invention.

An electromagnetic capacity control valve 9 incorporated in a compressor 7 in the second preferred embodiment comprises a return spring 81 for returning a plunger 59 to an initial position thereof, a spring washer 82 for the return spring 81, and an adjustment plug 83 for adjusting a degree of displacement of the plunger 59. In the inside of bellows part 60, there is provided a return spring 84 for returning the bellows part 60 to an initial position thereof. Sill more, an electromagnetic coil 63 is provided with a cord 85 for electrical connection with the air conditioner ECU 10. At the end of a valve body 47, there is equipped a plug 86 for setting an initial load on the return spring 84.

Figure 15:
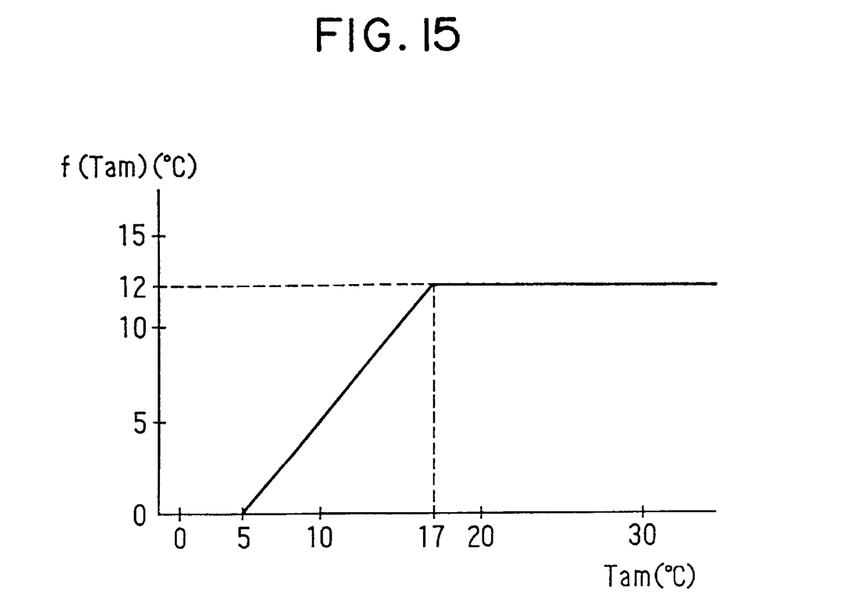
FIG. 15 is a characteristic graph showing the correlation between the outdoor air temperature and a third target post-evaporation temperature in a third preferred embodiment.

Third preferred embodiment:

Referring to FIG. 15, there is shown a characteristic graph indicating a correlation between an outdoor air temperature and a third target post-evaporation temperature in a third preferred embodiment of the present invention.

In the third preferred embodiment, instead of performing the calculation processing of step S7 in the routine illustrated in FIG. 5 flowchart of the first preferred embodiment, a value of third target post-evaporation temperature f(Tam) is calculated using an outdoor air temperature (Tam) detected by the outdoor air temperature sensor 92 according to a pattern shown in FIG. 15 which is programmed into the ROM, and a value of first target post-evaporation temperature (TEO1) is calculated (determined) from Equation (6) indicated below.

$$TEO1 = MIN\{f(TAO), F(Tam)\} \quad \text{(Equation 6)}$$

In Equation (6), values of f(TAO) and f(Tam) are compared, and a smaller one of these values is determined as a level of first target post-evaporation temperature (TEO1).

Other preferred embodiments:

Although the discharge capacity of the engine-driven compressor 7 is controlled so that a temperature of a downstream air flow immediately after passing through the evaporator 4, i.e., a level of post-evaporation temperature (TE) will meet a value of first target post-evaporation temperature (TEO1) or second target post-evaporation temperature (TEO2) in the present preferred embodiments, there may be provided such an arrangement that a motor-driven compressor having drive power independent of the engine E is employed to realize control of compressor discharge capacity by changing a rotational speed of the compressor instead of the above discharge control method.

Still more, while the first target post-evaporation temperature determining means 101, second target post-evaporation determining means 102, target post-evaporation temperature determining means 103 and compressor control means 104 are incorporated in the microcomputer of the air conditioner ECU 10 in the present preferred embodiments, there may be provided such an arrangement that these means are implemented separately or some or all of them are incorporated in an air conditioner control circuit or an engine ECU.

Moreover, instead of using a mapped parameter of target blowout temperature (TAO) in calculation of first target post-evaporation temperature (TEO1), it may be possible to use such an air-conditioning load parameter as outdoor air temperature (Tam), difference between set temperature (Tset) and indoor air temperature (Tr), or intensity of solar radiation (Ts).

Further, instead of using a mapped parameter of outdoor air temperature (Tam) in calculation of second target post-evaporation temperature (TEO2), it may be possible to use a discharge pressure parameter. Also, instead of using a rotational speed of the engine E (NE), it may be possible to use a vehicle speed or a rotational speed of the compressor 7.

Furthermore, while both values of indoor air temperature (Tr) and outdoor air temperature (Tam) are used to determine a temperature level of suction air to the evaporator 4 in the present preferred embodiments, there may be provided such an arrangement that either one of indoor air temperature (Tr) and outdoor air temperature (Tam) is used to determine a temperature level of suction air to the evaporator 4. In calculation of second target post-evaporation temperature (TEO2), it may also be possible to use only a value of outdoor air temperature (Tam) as a mapped parameter.

The invention may be embodied in other specific forms without departing from the spirit or essential characteristics thereof. The present preferred embodiments are therefore to be considered in all respects as illustrative and not restrictive, the scope of the invention being indicated by the appended claims rather by the foregoing description and all changes which come within the meaning and range of equivalency of the claims are therefore intended to be embraced therein.

What is claimed is:

1. An automotive air conditioner, comprising:
   (a) a duct for introducing air into a passenger compartment of an automobile;
   (b) a blower for causing the air to flow to the passenger compartment through said duct;
   (c) a refrigerating cycle system including a cooling heat exchanger for cooling the air passing through said duct by heat exchange with a refrigerant, and a refrigerant compressor for compressing refrigerant fed from said cooling heat exchanger and for discharging compressed refrigerant;
   (d) first cooling degree determining means for determining a first target cooling degree according to air-conditioning environmental factors necessary for conditioning air in the passenger compartment;
   (e) second cooling degree determining means for determining a second target cooling degree corresponding to a temperature level for ensuring oil return performance;
   (f) cooling degree determining means for selecting said first target cooling degree or said second target cooling degree, whichever is smaller, as a target cooling degree;
   (g) cooling degree detecting means for detecting a degree of actual air cooling by said cooling heat exchanger; and
   (h) compressor control means for controlling a rate of refrigerant discharge from said refrigerant compressor so that a degree of actual air cooling detected by said cooling degree detecting means will meet a target cooling degree selected by said cooling degree determining means.

2. An automotive air conditioner according to claim 1, wherein said refrigerant compressor is rotationally driven by an automobile engine (E), and discharge capacity varying means is provided for regulating a discharge capacity of refrigerant fed out of a discharge outlet thereof.

3. An automotive air conditioner according to claim 1, wherein said first cooling degree determining means checks an air-conditioning load on said refrigerating cycle system using air-conditioning environmental factors, including outdoor air temperature, and determines said first target cooling degree according to results of an air-conditioning load check.

4. An automotive air conditioner according to claim 1, wherein a lower limit of target cooling degree is determined according to a temperature of suction air to said cooling heat exchanger is used as said second target cooling degree in said second cooling degree determining means.

5. An automotive air conditioner according to claim 1, wherein said cooling heat exchanger is provided as a refrigerant evaporator for evaporating refrigerant fed from pressure reducing means of said refrigerating cycle system, and said cooling degree detecting means is provided as a post-evaporation temperature sensor for detecting a temperature of the air immediately after passing through said refrigerant evaporator.

6. A control system for an automotive air conditioner, comprising:
   a plurality of temperature sensors that sense temperatures at predetermined automobile locations, and generate temperature signals in response thereto;
   a controller that is connected to the sensors, and that is programmed to determine a first target cooling degree according to air-conditioning environmental factors necessary for conditioning air in a passenger compartment, to determine a second target cooling degree corresponding to a temperature level for ensuring oil return performance, and to select said first target cooling degree or said second target cooling degree, whichever is smaller, as a target cooling degree;

a post-evaporation temperature sensor that detects a degree of actual air cooling by the air conditioner unit; and the controller being programmed control a rate of refrigerant discharge from the air conditioner so that a degree of actual air cooling detected by said post-evaporation temperature sensor will meet a target cooling degree selected by said controller.

7. The system of claim 6, further comprising a refrigerant compressor for compressing system refrigerant, and for discharging compressed refrigerant, the compressor including an electronically-controlled capacity control valve connected to the controller that limits the system refrigerant flowing therethrough in response to control signals received from the controller.

8. The system of claim 7, wherein the capacity control valve includes a plunger that is displaced according to a predetermined refrigerant volume, a biasing member that biases the plunger to a return position, and an adjustment mechanism that allows a position of the plunger to be adjusted according to the control signals received from the controller.

9. A method of controlling an automotive air conditioner, comprising the steps of:

introducing air into a motor vehicle passenger compartment;

conditioning air to be blown into a passenger compartment via a refrigerating cycle system that includes a cooling heat exchanger for cooling the air by heat exchange with a refrigerant, and a compressor that compresses the refrigerant fed from the cooling heat exchanger, and that discharges the compressed refrigerant to the heat exchanger;

determining a first target cooling degree according to air-conditioning environmental factors;

determining a second target cooling degree corresponding to a temperature level for ensuring oil return performance;

selecting one of the first and second target cooling degrees as a target cooling degree;

detecting a degree of actual air cooling by the air conditioner; and controlling a rate of refrigerant discharge from the compressor so that a degree of actual air cooling detected at the step of detecting a degree of actual air cooling will meet a target cooling degree selected at the step of selecting one of the first and second target cooling degrees.

10. The method of claim 9, further comprising the step of checking an air-conditioning load on the air conditioner prior to the step of determining a first target cooling degree.

11. The method of claim 10, wherein the step of determining a first target cooling degree is based on the step of checking an air-conditioner load.

12. The method of claim 9, wherein the step of determining a second target cooling degree comprises determining a lower limit of target cooling degree according to a temperature of suction air to the cooling heat exchanger.

13. The method of claim 9, wherein the step of determining a second target cooling degree comprises calculating a target post-evaporation temperature by using a detected outdoor air temperature.

* * * * *